United States Patent
Turakhia

(10) Patent No.: US 9,614,967 B2
(45) Date of Patent: Apr. 4, 2017

(54) INTERNATIONAL DIALING THROUGH A RELAY

(71) Applicant: Riva FZC, Ras Al Khaimah (AE)

(72) Inventor: Bhavin Turakhia, Mumbai (IN)

(73) Assignee: Riva FZC (AE)

(*) Notice: Subject to any disclaimer, the term of this patent is extended or adjusted under 35 U.S.C. 154(b) by 70 days.

(21) Appl. No.: 14/326,338

(22) Filed: Jul. 8, 2014

(65) Prior Publication Data

US 2015/0271338 A1   Sep. 24, 2015

Related U.S. Application Data

(63) Continuation-in-part of application No. 14/295,256, filed on Jun. 3, 2014.

(30) Foreign Application Priority Data

Mar. 19, 2014  (IN) ........................... 906/MUM/2014
May 15, 2014  (IN) ......................... 1648/MUM/2014

(51) Int. Cl.
| | |
|---|---|
| *H04M 3/42* | (2006.01) |
| *H04L 29/08* | (2006.01) |
| *H04W 40/00* | (2009.01) |
| *H04M 3/54* | (2006.01) |
| *H04W 4/16* | (2009.01) |

(52) U.S. Cl.
CPC ............ *H04M 3/541* (2013.01); *H04W 4/16* (2013.01)

(58) Field of Classification Search
CPC .... H04M 3/42229; H04M 15/00; H04M 3/54; H04M 3/42
USPC .......... 455/414.1, 414.4, 415, 445, 459-461
See application file for complete search history.

(56) References Cited

U.S. PATENT DOCUMENTS

| | | | |
|---|---|---|---|
| 6,941,159 B2 | 9/2005 | Tsai et al. | |
| 7,474,634 B1* | 1/2009 | Webster | H04L 12/1822 370/261 |
| 2007/0121841 A1* | 5/2007 | Shin | H04M 3/424 379/114.2 |
| 2010/0080370 A1* | 4/2010 | Fiorentino | G06Q 40/02 379/114.03 |
| 2010/0184413 A1 | 7/2010 | Jo et al. | |
| 2010/0246506 A1* | 9/2010 | Krishnaswamy | H04W 72/085 370/329 |

(Continued)

OTHER PUBLICATIONS

International Application Serial No. PCT/IN2014/000341, International Search Report mailed Dec. 30, 2014.

(Continued)

*Primary Examiner* — Dung Hong
(74) *Attorney, Agent, or Firm* — Schwegman Lundberg & Woessner, P.A.

(57) ABSTRACT

Systems and methods for international dialing through a relay are provided. In an example embodiment, a communication is received at a server from a communication application installed on a device of a caller. The communication includes a destination number. A mapping of the destination number to a single call attribute is stored in a database of the server. A call to a pool number is received at the server from the caller. A determination is made of a call attribute from the call. Based on the call attribute from the call matching the single call attribute mapped to the destination number, the call is connected to the destination number.

17 Claims, 7 Drawing Sheets

(56) References Cited

U.S. PATENT DOCUMENTS

| | | | |
|---|---|---|---|
| 2014/0106704 A1* | 4/2014 | Cooke | H04W 24/08 455/405 |
| 2014/0161242 A1 | 6/2014 | Reiher | |
| 2015/0271337 A1 | 9/2015 | Turakhia | |

OTHER PUBLICATIONS

International Application Serial No. PCT/IN2014/000341, Written Opinion mailed Dec. 30, 2014.
U.S. Appl. No. 14/295,256, Non Final Office Action mailed Feb. 25, 2016, 11 pgs.

* cited by examiner

INTERNATIONAL DIALING THROUGH A RELAY

CROSS REFERENCE TO RELATED APPLICATIONS

The present application claims the priority benefit under 35 U.S.C. §119 of Indian Patent Application No. 1648/MUM/2014, filed on May 15, 2014, and also is a continuation-in-part of, and claims the priority benefit of U.S. patent application Ser. No. 14/295,256, filed on Jun. 3, 2014, which in turn claims the priority benefit under 35 U.S.C. §119 of Indian Patent Application No. 906/MUM/2014, filed on Mar. 19, 2014, all of which are incorporated herein by reference in their entirety.

FIELD

The present disclosure relates generally to communications, and in a specific example embodiment, to facilitating dialing through a relay.

BACKGROUND

When a user wants to call an individual internationally from his mobile device, the user typically dials the international phone number of the individual. The cost for the international call typically be greater than a domestic or local call for the user. While some systems allow for cheaper calls using Voice-over-IP (VoIP), VoIP is typically available only where the user's mobile device has a good Internet connection. Additionally, the call quality of a VoIP call may be sometimes problematic.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various example embodiments of the inventive subject matter. It will be evident, however, to those skilled in the art that embodiments of the inventive subject matter may be practiced without these specific details. In general, well-known instruction instances, protocols, structures, and techniques have not been shown in detail.

Systems and methods for international dialing through a relay are provided. In an example embodiment, a communication is received at a server from a communication application executing on a device of a caller. The communication includes at least a destination number. A mapping entry pair that maps the destination number to a single call attribute is created and stored to a database of the server. A call to a pool number is received at the server from the caller. The pool number may be generic or specifically assigned to the destination number. A determination is made of a call attribute from the call. Based on the call attribute from the call matching the single call attribute mapped to the destination number in the database, the call is relayed to the destination number.

Figure 1:
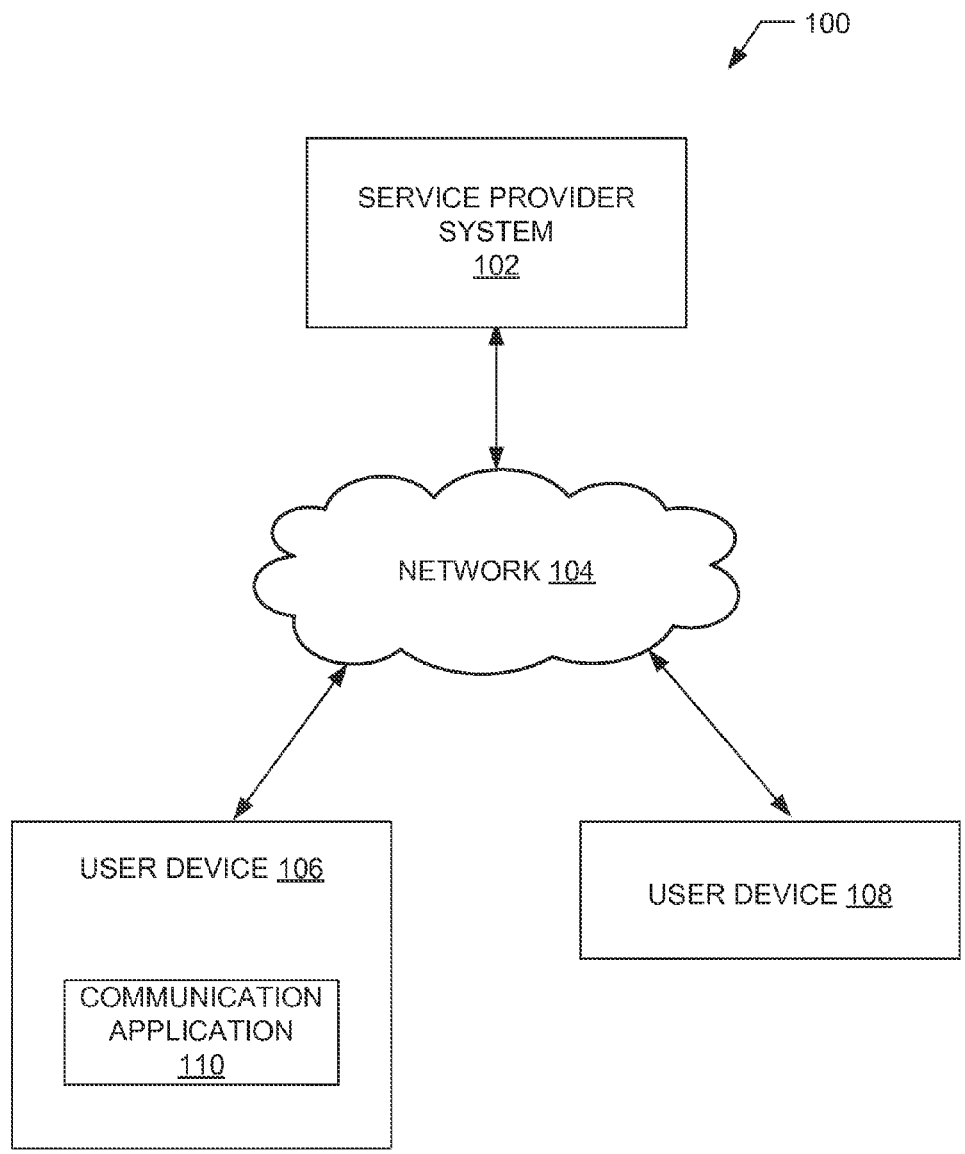
FIG. 1 is a diagram illustrating an example environment in which embodiments of a system for dialing through call connections may be implemented.

With reference to FIG. 1, a diagram illustrating an example environment 100 in which embodiments of a system for international dialing through a relay is provided. The environment 100 comprises a service provider system 102 coupled via a network 104 (e.g., the Internet, wireless network, cellular network, PSTN, or a Wide Area Network (WAN)) to a user device 106 of and a user device 108. The user device 106 is associated with a first user that is attempting to place an international or long distance call. In example embodiments, the first user may have downloaded or otherwise installed a communication application 110 on their user device 106 that communicates with the service provider system 102. The user device 106 may also have a native calling application for providing communication services. Thus, the user device 106 may comprise multiple applications for use in initiating a communication, and the user has an option to use any of these applications. The user device 106 may comprise a mobile phone, smartphone, laptop, tablet, or any other communication device that may store, access, or utilize the communication application 110.

The user device 108 is associated with a second user who may be a recipient of call initiated by the first user. In some embodiments, the second user may have downloaded or otherwise installed a communication application on their user device 108 that communicates with the service provider system 102. The user device 108 may also have a native calling application for providing communication services. Thus, the user device 108 may comprise multiple applications for use in initiating a communication. The user device 108 may comprise a mobile phone, smartphone, laptop, tablet, or any other communication device that may utilize, store, or access its own communication application. Alternatively, the user device 108 may not have the communication application or may not be a computing device. For example, the user device 108 may simply be a standard land line telephone.

The communication application 110 comprise pieces of functionality on the user device 106 that provides functions or operations that allow the first user of the user device 106 to conduct an international call using a relay provided by the service provider system 102, as will be discussed in more detail below. In some embodiments, the service provider system 102 may provide the communication application 110 to the user device 106 (e.g., provide a downloadable version of the communication application 110, electronically send the communication application 110 to the user device 106, or physically send the communication application 110 to the first user via a storage medium such as a CD ROM). Some embodiments may be practiced without the use of the communication application 110 on (e.g., being stored by or being executed by) the user device 106.

It is noted that the environment 100 shown in FIG. 1 is merely an example. For instance, alternative embodiments may comprise any number of user devices 106 and 108 in the environment 100 and any number of service provider systems 102.

Figure 2:
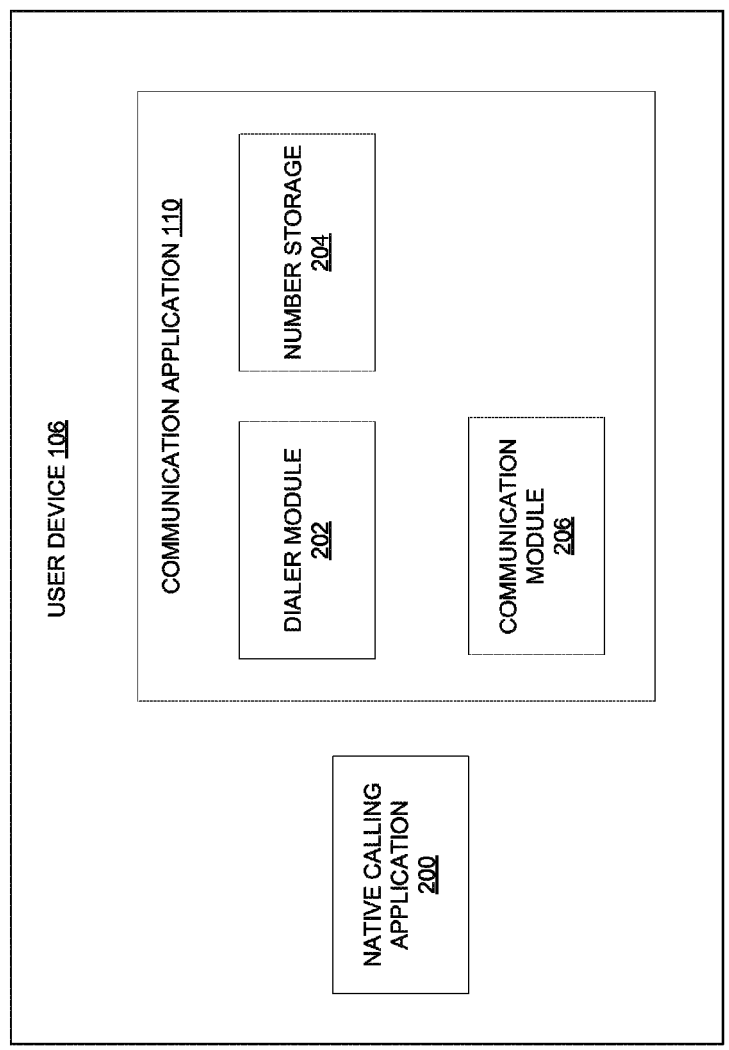
FIG. 2 is a block diagram illustrating an example embodiment of a user device.

Referring now to FIG. 2, a block diagram illustrating an example embodiment of the user device 106 of the first user is shown. The user device 106 is illustrated having the communication application 110 installed thereon. The user device 106 may also include a native calling application 200. In some embodiments, the communication application 110 and the native calling application 200 may be one and the same.

In some embodiments, the communication application 110 can provide functionalities or advantages over a native calling application 200 on the user device 106. For example, the use of the communication application 110 may allow for a lower rate or lower cost on international communications (e.g., calls, text messages, or chat messages) such that whenever the user tries to initiate an international call, the communication application 110 may send a communication to a server of a service provider system (e.g., service provider system 102). The communication includes the intended destination number and may include a call attribute to be mapped (e.g., assigned or otherwise correlated) to the destination number at the server. In one embodiment, a pool number (e.g., a local number relative to the first user) may be returned. The pool number may comprise a low cost alternative relative to calling the long distance number since the local number may be in a same county or area code as the user (and thus is a domestic low or no cost number). Accordingly, the communication application 110 may comprise a dialer module 202, a number storage 204, and a communication module 206. It is noted that the user device 106 and the communication application 110 may comprise other modules not pertinent to example embodiments, which are not shown or discussed.

The dialer module 202 manages calls initiated by the user device 106 that are directed to a destination number (e.g., an international call). For example, upon activation of the communication application 110, the international dialer module 202 allows the user of the user device 106 to dial an international number of a callee (e.g., the second user), provide a verbal command to call the destination number, or select the international number for the callee from stored contact information (e.g., from the number storage 204). The dialer module 202 may also be configured to call a pool number in response to the first user attempting to make an international or long distance call as will be discussed in further detail below.

Alternatively, the first user may use the native calling application 200 to initiate a call to the destination number. For example, the first user may manually input the destination number, provide a verbal command to call the destination number, or select the destination number from a stored contact list (e.g., stored in the number storage 204 or elsewhere in the user device 106). In these embodiments, the communication application 110 intercepts a call attempted by the native calling application 200 in order to process the call through a relay as discussed in more detail herein.

In either embodiment (e.g., call initiated using the communication application 110 or intercepted by the communication application 110), the communication module 206 may send a communication to the service provider system 102 that notifies the service provider system 102 regarding the impending call attempt to the destination number. In example embodiments, the communication comprises at least the intended destination number. In some embodiments, the communication may also comprise a call attribute that distinguishes a call made by the user device 106 from calls made by other users, and that the service provider system 102 may use to determine to which destination number to connect the call by the user device 106. The call attribute may include, for example, an identifier of the caller or a phone number of the user device 106. Alternatively, the call attribute may not be included in the communication, but be derived from the communication. For example, the phone number of the user device 106 may be derived based on the communication being sent from the user device (e.g., based on caller ID).

In accordance with one embodiment, a pool number may be returned by the service provider system 102 in response to the communication. For example, the pool number may be temporarily mapped to the destination number at the service provider system 102 for just one call to the destination number. The communication module 206 may receive the mapped pool number and provide the pool number to the dialer module 202. The dialer module 202 may then initiate a call to the pool number.

Alternatively, the communication application 110 (e.g., the dialer module 202) may randomly select a pool number from a set of available pool numbers, provide the selected pool number to the service provider system 102 (e.g., in the communication), and indicate that the selected pool number is the pool number it will use to call the service provider system 102. In this embodiment, the service provider system 102 may confirm whether the communication application 110 should use the selected pool number, and maps the selected pool number to the destination number if the selected pool number is to be used to call the service provider system 102.

In an alternative embodiment, no mapped pool number is used by the communication application 110. Instead, after the communication is sent by the communication module 206 notifying the service provider system 102 of the impending call attempt, the dialer module 202 may call one of any number of general pool numbers that correspond to the service provider system 102. In these embodiments, a call attribute contained in or derived from the communication may be used to map the call (to the general pool number) to the destination number at the service provider system 102 as will be discussed in more detail below.

Figure 3:
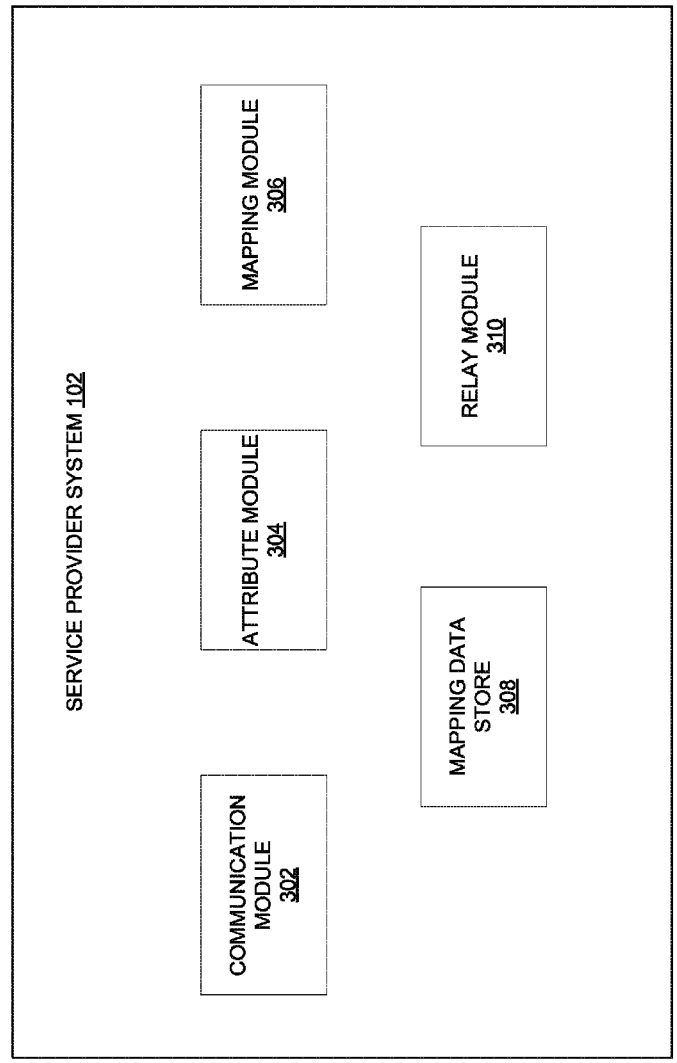
FIG. 3 is a block diagram illustrating an example embodiment of a service provider system.

Referring now to FIG. 3, the service provider system 102 is shown in more detail. In example embodiments, the service provider system 102 may comprise one or more servers that provide communication functionalities and services including international (or long distance) dialing through a relay. To enable these functionalities and services, the service provider system 102 may comprise a communication module 302, an attribute module 304, a mapping module 306, a mapping data store 308, and a relay module 310 coupled in communication with each other. The service provider system 102 may comprise other components not pertinent to example embodiments that are not shown or discussed. Furthermore, alternative embodiments may comprise more, less, multiples of, or other modules for providing international dialing through a relay. Additionally, some functions of the modules may be combined or divided into two or more further modules.

The communication module 302 manages reception and responses for communications and calls from various user devices. In example embodiments, the communication module 302 receives the communication from the communication application 110 of the user device 106. The communication may be received via short messaging service (SMS), over the Internet, or via a further call conducted prior to the call to a pool number of the service provider system 102. The communication provides an indication that a subsequent call will be initiated by (e.g., sent from) the user device 106. Accordingly, the communication module 302 may extract the destination number indicated in the communication and provide the destination number to the mapping module 306.

In some cases, the communication may also provide or be used to derive a call attribute. For example, the communication may indicate a user identifier of the user of the user device 106 or a phone number of the user device 106. The attribute module 304 extracts or derives the call attribute and provides the call attribute to the mapping module 306 as well.

In other embodiments, the communication indicates the destination number and makes a request for a pool number. In these embodiments, the communication module 302 communicates the destination number to the mapping module 306 and receives a pool number that is mapped to the destination number by the mapping module 306. The communication module 302 then transmits a response to the communication from the user device 106, and this response includes the mapped pool number that should be used by the communication application 110 to initiate a call to the destination number.

Further still, the communication module 302 receives a call from the communication application 110 of the first user after the receipt of the communication (e.g., within seconds of the receipt of the communication or provision of the response to the pool number request). In some instances, the call is made to a general (pool) number associated with the service provider system 102. In these cases, since the general number does not provide any indication of what destination number to relay the call to, the attribute module 304 determines a call attribute from the call. For example, the attribute module 304 may determine a phone number (e.g., using caller ID) or a user identifier from the call. The call attribute is then used by the mapping module 306 to determine a match for the destination number.

In other instances, the call may be directed to a specific pool number that is mapped (e.g., assigned or otherwise correlated) to the destination number in response to the communication. The communication module 302 receives the call and identifies the specific pool number of the call. The specific pool number is then used by the mapping module 306 to determine a match for the destination number.

The mapping module 306 manages the mapping of a destination number to a single call attribute. In example embodiments, the single call attribute is one of a phone number of the user device 106, an identifier of the first user, or an assigned pool number. Accordingly, the mapping module 306 may receive the phone number or the identifier of the first user that is obtained by the attribute module 304 from the communication along with the destination number. The mapping module 306 may map the phone number to the destination number. Alternatively, the mapping module 304 may map the identifier of the first user to the destination number. The mapping is then stored to the mapping data store 308.

In embodiments where the communication from the communication application 110 comprises a request for a pool number, the mapping module 306 receives the destination number obtained from the communication and maps a specific pool number to the destination number. The mapping of the pool number to the destination number is then stored to the mapping data store 308.

Once assigned to a destination number, the specific pool number becomes temporarily unavailable to be mapped to any other destination number. In example embodiments, the mapping of the pool number to the destination number is temporary. The mapping may be terminated (e.g., removed from the mapping data store 308) after a call to the destination number is relayed by the service provider system 102, upon completion of a call to the destination number, or after a predetermined period of time (e.g., two minutes of mapping the pool number to the destination number). Because the pool number is typically mapped to the destination number immediately before the call to the pool number by the communication application 110, the predetermined period of time may be relatively short.

The mapping module 306 also determines the destination number to which to relay a call that is received subsequent to the communication. In example embodiments, the mapping module 306 provides the destination number to which to relay the call based on a call attribute identified by the attribute module 304 from the call. For example, if the attribute module 304 determines the call attribute of the call is a phone number of the first user, the phone number is used by the mapping module 306 to find a mapping in the mapping data store 308 having the phone number. If a match is found, the destination number mapped to the phone number is provided to the relay module 310. A similar map lookup may be performed using the identifier of the user or a specific pool number or the specifically assigned pool number.

The mapping data store 308 may comprise a database of data records (e.g., tables) having one-to-one mapping entries (e.g., mapping entry pairs) of a destination number to a single call attribute. As such, the destination number may be mapped to the phone number of the user device 106, the destination number may be mapped to the identifier of the user, or the destination number may be mapped to the assigned pool number. It is noted that other call attributes may be mapped to the destination number.

The relay module 310 relays the call to the destination number that is determined by the mapping module 306. As such, the relay module 314 receives the destination number determined by the mapping module 306 from a mapping entry pair and connects the first user to the second user at the destination number by relaying the call to the destination number.

Figure 4:
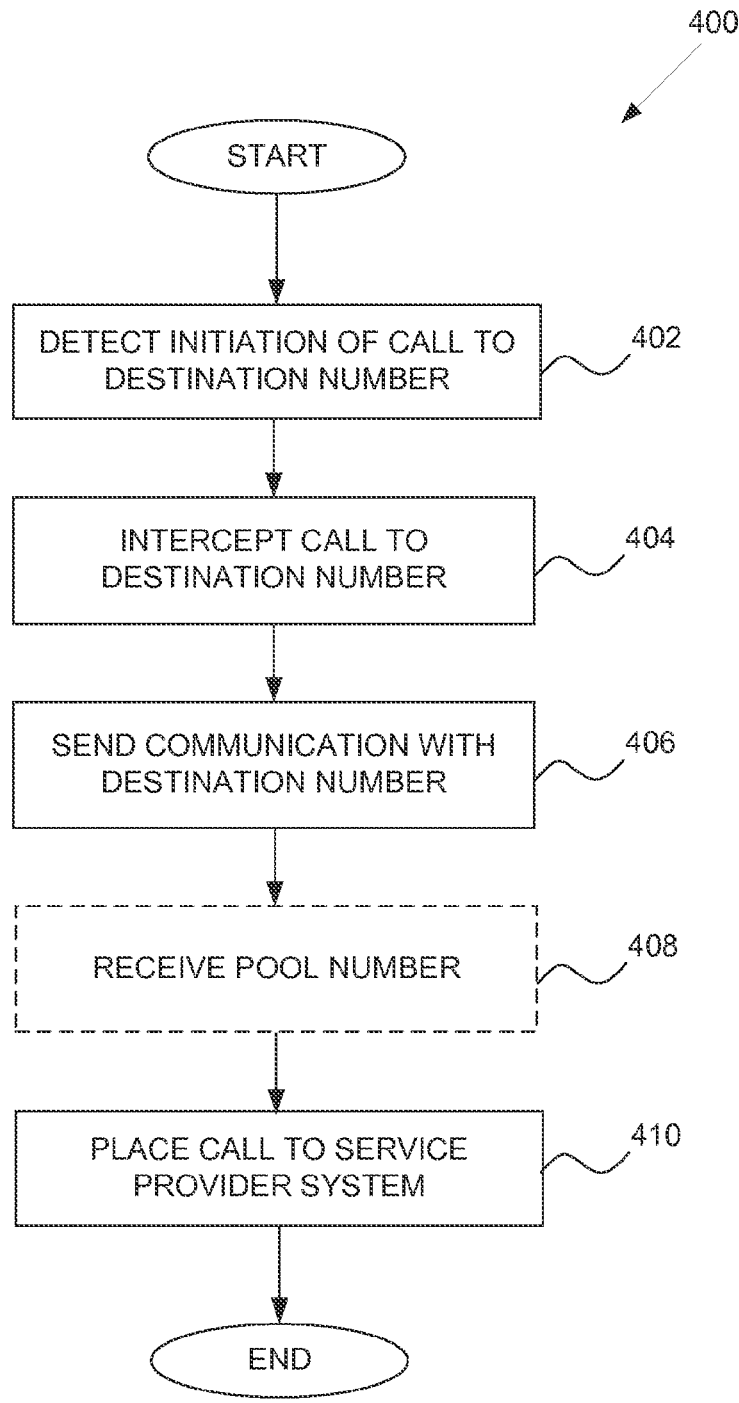
FIG. 4 is a flow diagram of an example method for placing a call at a user device.

FIG. 4 is a flow diagram of an example method 400 for placing a call initiated by the user device 106. The operations of the method 400 may be performed by the communication application 110 executing on the user device 106. In operation 402, the communication application 110 detects an initiation of a call to a destination number. For example, the user of the user device 106 may dial an international number of a callee (e.g., the second user) using the native calling application 200 or the dialer module 202 or select the international number for the callee from a stored contact list (e.g., from the number storage 204).

In embodiments where the user initiates the call to the destination number using the native calling application 200, the communication application 110 intercepts the call in operation 404. As such, the communication application 110 stops the native application 200 from completing a call connection to the destination number.

In operation 406, the communication module 206 sends a communication to the service provider system 102 that notifies the service provider system 102 regarding a future call to the destination number. The communication includes or indicates the destination number. In some embodiments, the communication may also comprise a call attribute that will distinguish a subsequent call made by the user device 106 from other calls from other users. In some embodiments, the communication may include a request for a specific pool number to be temporarily mapped to the destination number.

In operation 408, the communication module 206 may receive a mapped pool number in response to the request for the pool number in the sent communication. The pool number is specifically mapped to the destination number in the communication for a temporary period of time or a single use. Because a specifically assigned pool number may only be used in some embodiments (e.g., when requested in the communication), operation 408 is optional in certain embodiments. If a pool number is received, the pool number is provided to the dialer module 202.

In operation 410, a call is placed to the service provider system 102. In example embodiments where the mapped pool number is used, the dialer module 202 initiates the call to the specifically mapped pool number. In embodiments where a mapped pool number is not requested from the service provider system 102 or used, the dialer module 202 may call a generic pool number for the service provider system 102 (e.g., one of many pool numbers than can be used to generally access the service provider system 102). The generic pool number is generic because it is not mapped to a specific destination number. As a result, any number of users and user devices may use the same generic pool number at the same time to initiate a call that is relayed through the service provider system 102. It is noted that the caller (e.g., the first user) need not use the same user device 106 that sent the communication to call the pool number (e.g., a mapped pool number may be called from another device of the first user).

Figure 5:
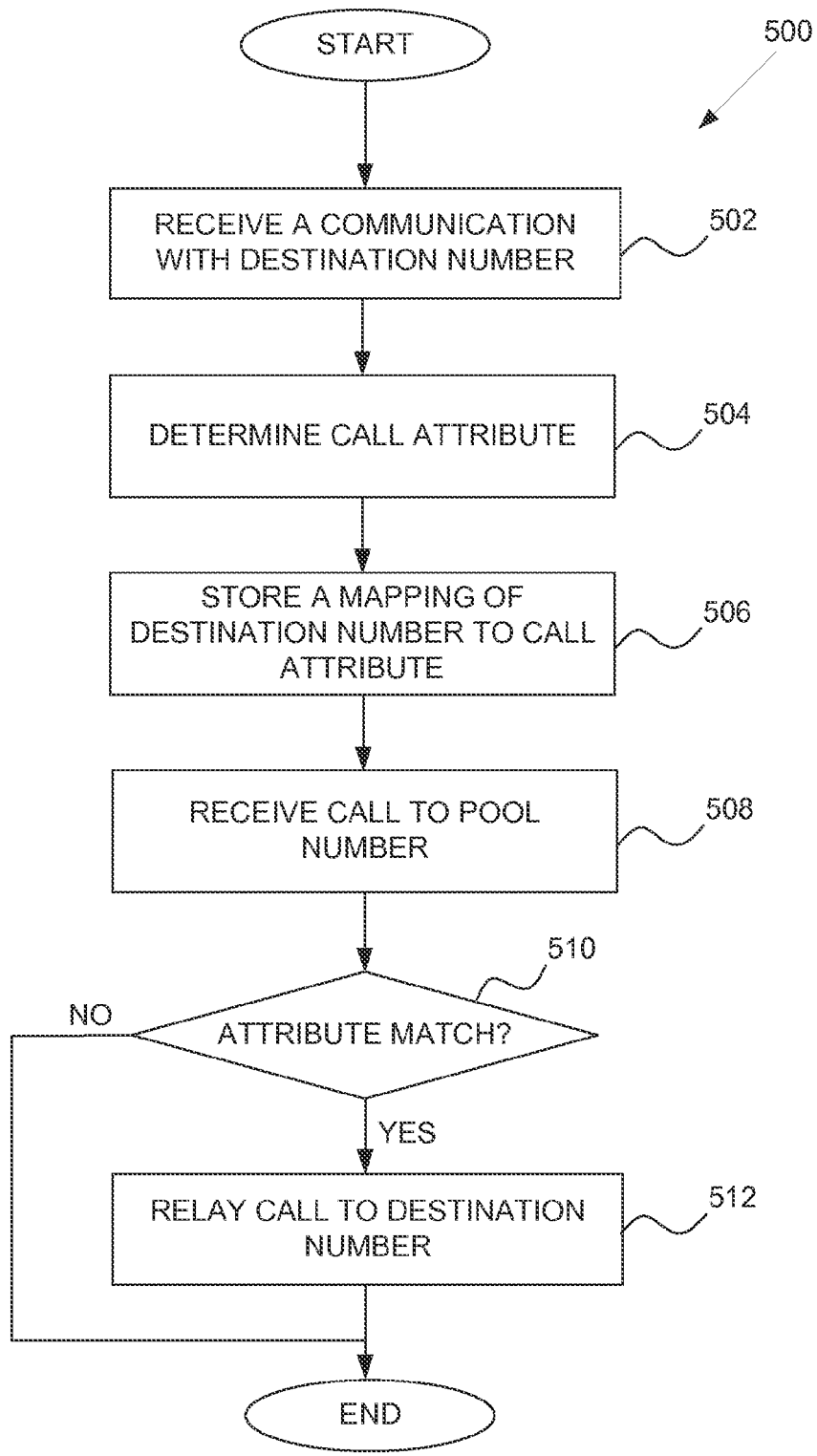
FIG. 5 is a flow diagram of an example method for providing international dialing through a relay.

FIG. 5 is a flow diagram of an example method 500 for providing international dialing through a relay. In the embodiment of FIG. 5, no pool number is mapped or assigned to a destination number. The operations of the method 500 are performed by the service provider system 102. The method 500 starts with receipt of a communication from the user device 102 in operation 502. The communication is an indication of an impending call from the user device 102 that should be relayed to the destination number. For example, the communication may be received within seconds of the call. The communication indicates at least the destination number of the impending call.

The communication may also indicate or be used to derive a call attribute. As such, in operation 504, the call attribute is determined by the attribute module 304. For example, the attribute module 304 may identify (e.g., using caller ID), a phone number of the user device 106, or a user identifier of the first user.

The call attribute is provided to the mapping module 306 along with the destination number. The mapping module 306 creates a mapping entry pair (e.g. a one-to-one mapping) using the destination number and the call attribute. The mapping entry pair is stored in the mapping data store 308 in operation 506.

Subsequently, a call is received to a generic pool number of the service provider system 110 in operation 508. Once the call is received, the attribute module 304 determines a call attribute from the call. For example, the attribute module 304 may determine a phone number of the user device 106 making the call, a user identifier (e.g., of the first user), or an identifier corresponding to the communication application 110 on the user device 110.

In operation 510, a determination is made as to whether the call attribute has a matching mapping entry pair in the mapping data store 308. In example embodiments, the mapping module 306 receives the call attribute determined by the attribute module 304 and performs a lookup in the mapping data store 308 for the call attribute. If the call attribute is found, the matched mapping entry pair is retrieved.

The destination number from the retrieved mapping entry pair is then used to connect the first user at the user device 106 to his intended callee (e.g., the second user). As such, the relay module 310 relays the call to the destination number in operation 512.

Figure 6:
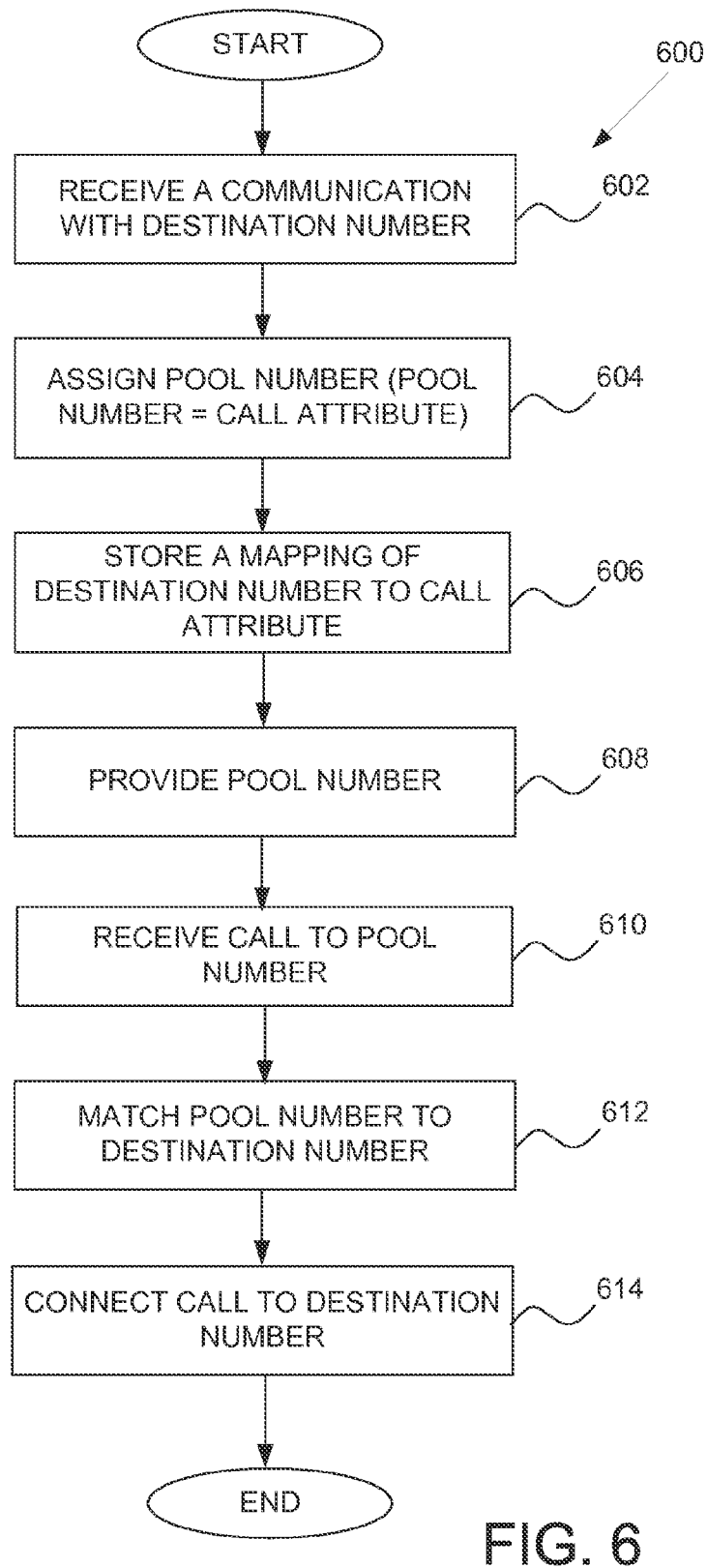
FIG. 6 is a flow diagram of an alternative example method for providing international dialing through a relay.

FIG. 6 is a flow diagram of an alternative example method 600 for providing international dialing through a relay. In the embodiment of FIG. 6, a pool number is mapped or assigned to the destination number. The operations of the method 600 are performed by the service provider system 102. The method 600 starts with receipt of a communication from the user device 102 in operation 602. The communication is an indication of an impending call from the user device 102 that should be relayed to the destination number. The communication indicates at least the destination number of the impending call.

The communication may also request a pool number. As such, in operation 604, the mapping module 306 selects a pool number and maps the selected pool number to the destination number from the communication. As such, the pool number is the (single) call attribute in the embodiment of FIG. 6. The mapping entry pair of the pool number and the destination number is stored in operation 606.

The pool number is returned in a response to the request in the communication by the communication module 302 in operation 608. The communication module 302 may then wait for a call to the pool number. Subsequently, the call is received to the mapped pool number in operation 610.

Once the call is received, the attribute module 304 determines the call attribute from the call (e.g., the pool number). In operation 612, a determination is made as to whether the call attribute has a matching mapping entry pair in the mapping data store 308. In example embodiments, the mapping module 306 receives the pool number determined by the attribute module 304 and performs a lookup in the mapping data store 308 for the pool number. If the pool number is found, the matched mapping entry pair is retrieved.

The destination number from the retrieved mapping entry pair is then used to connect the first user at the user device 106 to his intended callee (e.g., the second user). As such, the relay module 310 relays the call to the destination number in operation 614.

Figure 7:
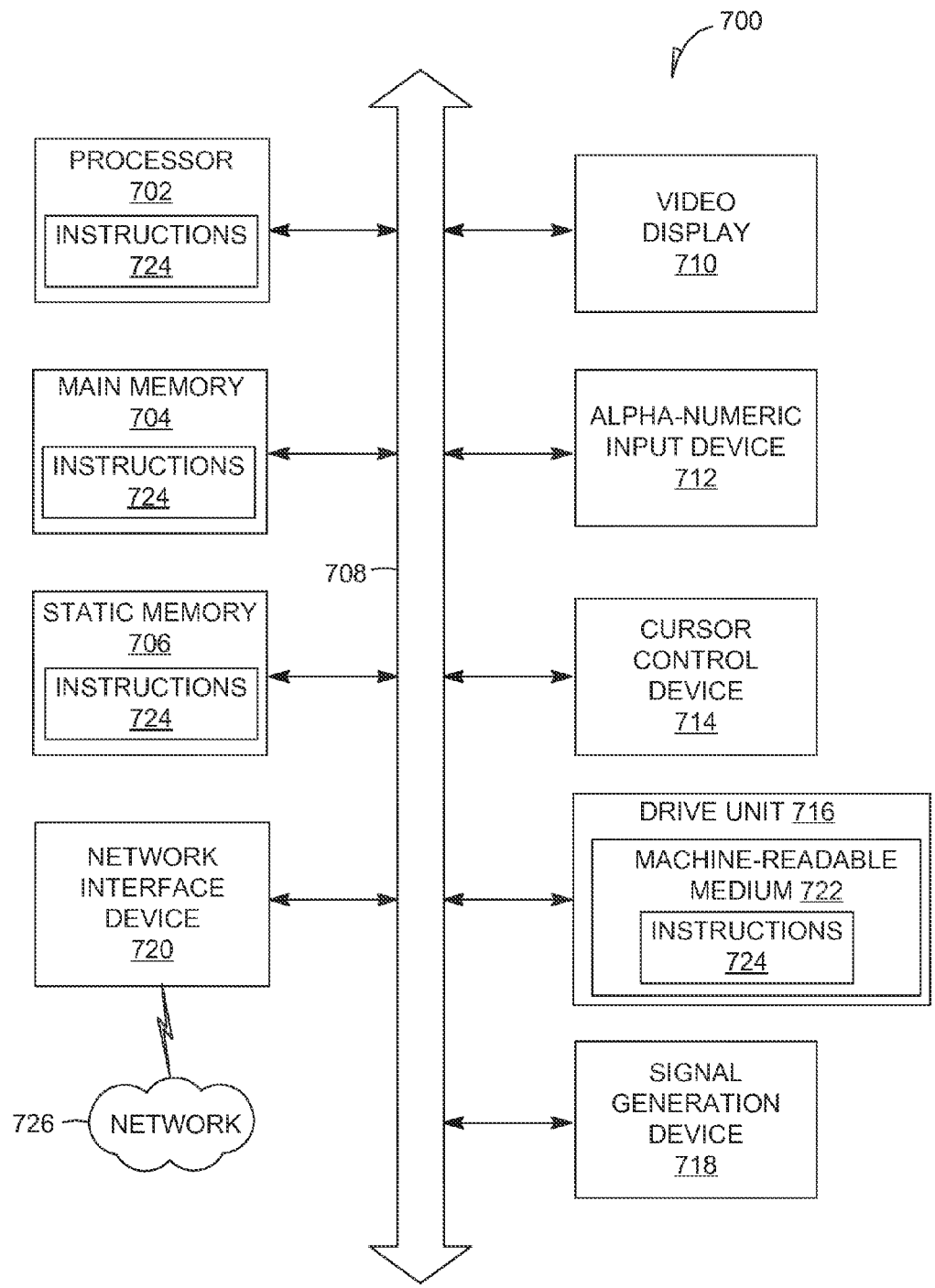
FIG. 7 is a simplified block diagram of a machine in an example form of a computing system within which a set of instructions for causing the machine to perform any one or more of the methodologies discussed herein may be executed.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system and within which instructions 724 (e.g., software, a program, an application, an applet, an app, or other executable code) for causing the machine 700 to perform any one or more of the methodologies discussed herein may be executed. In alternative embodiments, the machine 700 operates as a stand-alone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alpha-numeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a tangible machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such inns are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving, at a server and from a communication application executing on a device of a caller, a communication that includes a destination number, the receiving of the communication being triggered by the caller initiating a call to the destination number at the device, the initiating the call to the destination number being in response to an operation selected from the group consisting of receiving a selection of a contact from a contact list, receiving a manual input of the destination number, and receiving a verbal command to call the destination number;

storing, in a database of the server, a mapping entry pair that maps the destination number to a single call attribute;

receiving, at the server, a call to a pool number from the caller;

determining, using a hardware processor, a call attribute from the call; and relaying the call to the destination number based on the call attribute from the call matching the single call attribute mapped to the destination number.

2. The method of claim 1, wherein the single call attribute is an identifier of the caller.

3. The method of claim 1, wherein the single call attribute is a phone number of the caller.

4. The method of claim 1, further comprising providing the pool number to the communication application in response to the receiving of the communication, wherein the single call attribute is the pool number.

5. The method of claim 1, wherein the single call attribute is included in the communication that includes the destination number.

6. The method of claim 1, wherein the communication is received via short messaging service (SMS), over the Internet, or via a further call conducted prior to the call to the pool number.

7. The method of claim 1, further comprising removing the mapping entry pair that maps the destination number to the single call attribute based on expiration of a predetermined period of time.

8. The method of claim 1, further comprising removing the mapping entry pair that maps the destination number to the single call attribute based on expiration of a predetermined period of time after the relaying of the call to the destination number.

9. A machine-readable storage medium having no transitory signals and storing instructions that, when executed by the at least one processor of a machine, cause the machine to perform operations comprising:

receiving, at a server and from a communication application executing on a device of a caller, a communication that includes a destination number, the receiving of the communication being triggered by the caller initiating a call to the destination number at the device, the initiating the call to the destination number being in response to an operation selected from the group consisting of receiving a selection of a contact from a contact list, receiving a manual input of the destination number, and receiving a verbal command to call the destination number;

storing, in a database of the server, a mapping entry pair that maps the destination number to a single call attribute;

receiving, at the server, a call to a pool number from the caller;

determining a call attribute from the call; and relaying the call to the destination number based on the call attribute from the call matching the single call attribute mapped to the destination number.

10. The machine-readable storage medium of claim 9, wherein the single call attribute is an identifier of the caller.

11. The machine-readable storage medium of claim 9, wherein the single call attribute is a phone number of the caller.

12. The machine-readable storage medium of claim 9, wherein the operations further comprise providing the pool number to the communication application in response to the receiving of the communication, wherein the single call attribute is the pool number.

13. The machine-readable storage medium of claim 9, wherein the single call attribute is included in the communication that includes the destination number.

14. The machine-readable storage medium of claim 9, wherein the communication is received via short messaging service (SMS), over the Internet, or via a further call conducted prior to the call to the pool number.

15. The machine-readable storage medium of claim 9, wherein the operations further comprise removing the mapping entry pair that maps the destination number to a single call attribute based on expiration of a predetermined period of time.

16. The machine-readable storage medium of claim 9, wherein the operations further comprise removing the mapping entry pair that maps the destination number to the single call attribute in response to the connecting of the call to the destination number.

17. A system comprising:

one or more hardware processors of a server configured to perform operations comprising:

receiving, at the server and from a communication application executing on a device of a caller, a communication that includes a destination number, the receiving of the communication being triggered by the caller initiating a call to the destination number at the device, the initiating the call to the destination number being in response to an operation selected from the group consisting of receiving a selection of a contact from a contact list, receiving a manual input of the destination number, and receiving a verbal command to call the destination number;

storing, in a database of the server, a mapping entry pair that maps the destination number to a single call attribute;

receiving, at the server, a call to a pool number from the caller;

determining a call attribute from the call; and relaying the call to the destination number based on the call attribute from the call matching the single call attribute mapped to the destination number.

* * * * *

UNITED STATES PATENT AND TRADEMARK OFFICE
CERTIFICATE OF CORRECTION

PATENT NO. : 9,614,967 B2  
APPLICATION NO. : 14/326338  
DATED : April 4, 2017  
INVENTOR(S) : Bhavin Turakhia Page 1 of 1

It is certified that error appears in the above-identified patent and that said Letters Patent is hereby corrected as shown below:

In the Specification

In Column 1, Line 28, after "call", insert --will--

In Column 6, Line 44, delete "314" and insert --310-- therefor

In Column 7, Line 44, delete "102" and insert --106-- therefor

In Column 7, Line 46, delete "102" and insert --106-- therefor

In Column 7, Line 63, delete "110" and insert --102-- therefor

In Column 8, Line 2, delete "110." and insert --106.-- therefor

In Column 8, Line 22, delete "102" and insert --106-- therefor

In Column 8, Line 23, delete "102" and insert --106-- therefor

In Column 12, Line 28, delete "inns" and insert --claims-- therefor

Signed and Sealed this  
Tenth Day of July, 2018

Andrei Iancu  
*Director of the United States Patent and Trademark Office*